Patented Oct. 4, 1938

2,131,841

UNITED STATES PATENT OFFICE 2,131,841

PROCESSING OF CALCINED PIGMENTS

Sanford C. Lyons, Bennington, Vt., assignor to Bird Machine Co., Walpole, Mass., a corporation of Massachusetts No Drawing. Application May 10, 1937, Serial No. 141,710

15 Claims. (Cl. 134—58)

This invention relates to the processing of calcined pigments with a view toward arriving at a finished pigment product of such fineness of particle size, freedom from water-soluble contaminations, and other qualities as to render such product eminently useful for various purposes, for instance, in paints, lacquers, resins, and other compositions.

In producing pigments for use in paint and lacquer compositions, it is customary to calcine the pigment particles, which are of extremely fine or colloidal particle size by reason of their previous formation through precipitation, so as to develop particles or aggregates of sufficiently larger dimensions to afford maximum opacity or covering power. In this latter connection, it might be noted that, when a pigment, e. g., titanium dioxide, is formed through precipitation, a substantial fraction of the pigment particles are apt to be of unduly fine particle size, namely, of a size less than the wave length of light just beyond the visible range, e. g., a wave length, 0.15, within the ultra-violet region, in consequence of which the pigment does not exhibit its maximum potential light-reflecting or covering property. It is for this latter reason that pigment production includes a calcining operation, in the course of which the ultra-fine or colloidal pigment particles are caused to cluster into aggregates distinctly larger than such wave length of light just beyond the visible range. Inasmuch as the growth of pigment particles during the calcining operation cannot be controlled with precision or accuracy, it is invariably the case that the pigment emerging from the calcining kiln contains a substantial fraction of undesirably large pigment clusters or aggregates, that is, clusters or aggregates so coarse and gritty as to detract from the smoothness, homogeneity of texture, and covering power potentially realizable from the pigment.

The invention hereof will be discussed in terms of the processing of titanium dioxide as it emerges from a calcining kiln, but it is to be understood that the inventive principles hereof are applicable to other pigments prepared by processes inclusive of precipitating and calcining operations. Before entering into a discussion of the invention hereof, it is perhaps helpful to outline the production of titanium dioxide pigment up to and including the precipitating and calcining operations.

The common source of titanium dioxide pigment is the ore known as ilmenite, which is composed essentially of iron oxides and titanium oxide in proportions of, say, about 50% each. The ore is digested with strong sulphuric acid serving to transform the mixed oxides into iron and titanium sulphates. The cake of mixed iron and titanium sulphates thus produced is dissolved in water and the mixed salt solution is then treated with scrap iron or its equivalent to reduce the ferric sulphate to ferrous sulphate while the titanic sulphate is preserved largely as such. After silica and other water-insoluble impurities have been settled from the resulting solution of ferrous sulphate and titanic sulphate, the solution is filtered to produce a clear liquor which is then heated to boiling for the purpose of causing the decomposition by hydrolysis of the titanic sulphate into titanic hydroxide. The titanic hydroxide is precipitated as extremely fine or colloidal particles, a substantial fraction of which are smaller than even the wave length of light just beyond the visible range, as already indicated. The precipitated titanic hydroxide is washed free of iron salts during filtration or afterwards; and the washing treatment may be so thoroughly performed as to leave as little as, say, about 0.01% iron, calculated as oxide, in the washed product. Such residual iron salt as remains in the washed product is sometimes reduced to soluble ferrous salt by treatment of such product with suitable reducing agents, such as hyposulphurous acid or hyposulphite containing, if desired, powdered zinc dust or its equivalent, to accelerate the solubilization and decolorization of residual iron salt. After the decolorizing treatment, the precipitated titanic hydroxide may be washed and filtered from suspension in the form of a thick paste or plastic mass ready for the conventional calcining operation.

Preparatory to calcining the precipitated titanic hydroxide, it is desirable to admix therewith a suitable fluxing agent, such as potassium carbonate, which promotes growth or aggregation of the ultra-fine or coloidal particles to sizes distinctly greater than the wave length of light just beyond the visible range, as previously indicated. This may be done by admixing with the paste or plastic mass of titanic hydroxide sufficient potassium carbonate solution of appropriate strength to yield a thick slurry and removing free solution from the slurry to form a paste for introduction into the calcining kiln. During calcination, the titanic hydroxide is substantially completely dehydrated as the fine, ultra-fine, and colloidal particles form clusters or aggregates of titanium dioxide of promiscuous sizes distinctly greater than the wave length of light within the ultra-violet region, wherefore, the calcined product emerging from the kiln consists of titanium dioxide pigment, a substantial fraction of whose particles are undesirably gritty or oversized for lacquers, paints, and other compositions. It is hence generally the custom to reduce the calcined pigment as an aqueous slurry to finer particle size in a ball mill and to deliver the ball-milled slurry to grading or classifying apparatus serviceable for resolving the slurry into a fine pigment fraction for use in lacquers, paints, or the like and a relatively coarse or gritty pigment fraction for retreatment in the ball mill. However, the grading or classifying apparatus used in prior art practice has not only been cumbersome but has been imperfect, so far as concerns yielding a fine pigment fraction with the desired selectivity or freedom from oversized particles. In other words, it has yielded fine pigment fractions wherein there was still likely to be present considerable oversized or coarse pigment particles detracting from the smoothness, uniformity of texture, opacity or tinctorial power, and other qualities desired in lacquers or paints whereinto such fine fractions entered.

In accordance with the present invention, the calcined titanium oxide emerging from the calcining kiln is suspended in water to form a thick suspension, preferably in the substantial absence of any dispersing agents. The resulting suspension, which may well have a solids content of, say, about 30% to 35%, is progressively fed into a ball mill which reduces to finer particle size a considerable portion of the oversized or gritty pigment particles. The ball-milled suspension progressively leaving the ball mill may be passed as such or after dilution with water to a centrifuge, preferably a continuous flow centrifuge of the type shown in Lyons application Serial No. 89,886, filed July 10, 1936, which centrifuge is designed to receive at substantially constant rate or volume of flow an incoming stream of a solids suspension to be centrifuged as solids deposited from suspension on the centrifuge wall are being progressively emitted through one end of the centrifuge and liquid containing residual finer solids in suspension or practically devoid of solids is being emitted through the other end of the centrifuge. As further stressed in this application, centrifugation is performed under substantially constant solids-depositing conditions, including substantially constant effective centrifuging force, since the solids deposited on the centrifuge wall are progressively removed during the centrifuging operation and the rate of flow of suspension through the centrifuge and other significant factors are maintained substantially constant during the centrifuging operation. Accordant with the instant invention, the centrifuge is operated under combined conditions conducive to the progressive emission from the centrifuge of the oversized or gritty pigment particles, preferably particles of a size greater than about 2 microns, while the liquid effluent from the centrifuge consists of an aqueous suspension containing the pigment particles of a size finer than about 2 microns but, nevertheless, distinctly greater than the wave length of the light within the ultra-violet region, as previously indicated. It might be remarked that it is possible to ensure in the aqueous pigment suspension emitted from the centrifuge substantial freedom from relatively coarse and/or gritty pigment particles, that is, particles of a size of, say, 5 or 6 microns or greater, whereas, on the other hand, the relatively coarse solids fraction emitted from the centrifuge contains entrained therein but an insignificant amount of pigment particles of a size smaller than about 2 microns. It is thus seen that the centrifugal fractionating treatment performed hereby on the ball-milled pigment slurry is a highly selective one productive of a fine pigment fraction sharply defined from the coarse or gritty fraction with which it was originally associated.

The aqueous suspension of fine pigment particles resulting from the centrifugal fractionating treatment hereof may be subjected to suitable treatment for the recovery of its pigment content. Thus, when it is desirable or necessary that the finished pigment be as free as possible from water-soluble salts or other contaminations, the aqueous suspension of fine pigment particles may advantageously undergo the continuous electrophoretic centrifugating treatment described in Lyons Patent No. 2,057,156, dated October 13, 1936. Such electrophoretic centrifugating treatment is centered about the deposition of the pigment particles from aqueous suspension on a centrifuge wall under combined electrophoretic and centrifugal forces and the progressive removal from the centrifuge wall of the solids thus deposited thereon as fresh suspension to be electrophoretically centrifuged is being progressively fed into the centrifuge. The fine pigment fraction thus recovered from suspension as a moist plastic mass may be dried, disintegrated in a ball mill, hammermill, or equivalent instrumentality, and used as such in making lacquer, paint, and other compositions. The pigment product thus realized, being composed essentially only of particles of a size less than about 2 microns, is eminently adapted for its intended purpose by reason of the smoothness, uniformity of texture, and high opacity or covering power in coatings or films wherein it appears, The relatively coarse or oversized pigment fraction resulting herein from the centrifugating treatment of the ball-milled slurry may be repassed into the ball mill for further ball-milling along with fresh slurry of calcined pigment fed into the ball mill. The fraction of coarse pigment returned to the ball mill may, of course, vary, depending upon the rate at which slurry is being run therethrough and the other conditions determinative of the grinding efficiency thereof. Indeed, it is one of the advantages of the instant invention that the conditions of operation of the ball mill may be varied widely without affecting the quality of the useful or fine pigment product producible hereby. It might be noted that the effluent from the electrophoretic centrifuge, which may contain some residue of pigment suspended therein, may be reused at a suitable stage in the method hereof, for instance, be reused as the aqueous medium for suspending the titanium dioxide emerging from the calcining kiln or be recycled together with the relatively coarse or oversized pigment fraction into the ball mill.

In some instances, it may be preferable to apply other steps for recovering the fine or useful pigment fraction from the aqueous suspension of the fine pigment fraction produced by the centrifugating fractionating treatment hereof. Thus, such suspension may be treated with a suitable pigment-flocculating agent, such as magnesium sulphate, in amount controlled to generate pigment flocks of a size enabling substantially complete recovery of such flocks by ordinary centrifugation, as distinguished from electrophoretic centrifugation, by filtration on rotary filters, in filter presses, or the like, while avoiding so far as possible excess flocculating agent whose substantially complete removal from the recovered pigment solids may present some difficulty. Apropos of treating the aqueous suspension of fine or useful pigment with a pigment-flocculating agent, it might be observed that, by reason of initially dispersing the pigment in water in the substantial absence of pigment-dispersing agent, such as sodium silicate, a minimum amount of flocculating agent is necessary for developing in the suspension readily recoverable pigment flocks; and this means not only a saving in cost of flocculating agent but also greater freedom from residual water-soluble flocculating agent in the flocculated pigment product recovered from suspension by centrifugation or filtration. The fact is that the product thus recovered in the substantially complete absence of any rinsing with water, contains but a trace of water-soluble contamination, insomuch that it is useful for pigmenting various artificial resins, such as the phenol-formaldehyde resins and the urea resins, without causing the discoloration therein frequently imputable to water-soluble ingredients in the pigment. Again, the mere trace of water-soluble pigment-flocculating agent left in the pigment products hereof is insufficient to induce settling tendency in lacquers, paints, or like compositions into which they enter, as contrasted with the marked settling tendency in paints, lacquers, or the like in which there occurs pigment whose content of residual pigment-flocculating agent is relatively high.

The centrifugating fractionating treatment performed herein for the purpose of resolving the slurry of ball-milled pigment into a coarse pigment fraction returned to the ball mill and a relatively fine pigment fraction put to use affords important advantages over the gravitational hydro-separatory methods heretofore frequently relied upon for separating pigments into fine and coarse pigment fractions. In the gravitational hydro-separatory methods of the prior art, which depend essentially upon natural gravitational subsidence of the coarse pigment particles, while the fine pigment particles remain in suspension, it is virtually impossible to realize useful fractionation unless the pigment suspension is of relatively low solids content, say, about 8 to 12%; and even at such low solids content, it is usually the case that a dispersing agent, such as sodium silicate, is added to the pigment suspension to deflocculate the pigment particles and thereby to reduce the viscosity of the suspension markedly and to increase the rate of subsidence of the coarse pigment particles. In the process hereof, on the other hand, it is possible to perform the centrifugal fractionation of the calcined and ball-milled pigment suspension at a solids content markedly greater than 12%, for instance, at a solids content as high as 30% to 45%, without any difficulty whatever in effecting a sharp or selective resolution of the solids content of the suspension into a fine fraction and a relatively coarse fraction, even in the absence of any dispersing agent whatever in the suspension. Aside from the fact that pigment suspension can be handled most economically at high solids content, by reason of the smaller amount of water passing through the processing equipment, the absence of sodium silicate or like pigment-dispersing agent in the suspension ensures a finished pigment product whose particles do not tend to coalesce into aggregates, as is true of the pigment products which are derived from pigment suspensions containing sodium silicate or like pigment dispersing agent and which may hence contain residual silica gel or like cementitious material tending to bond together the pigment particles into undesirable aggregates. The method hereof presents the important advantage that, irrespective of variations in the pigment-calcining and ball-milling operations and variations in the ball-milled slurry, it may be controlled to give predetermined or reproducible results, i. e., pigment fractions of a particular particle size or particle size range and hence particularly adapted for certain purposes.

It should be understood by those skilled in the art that the principles of the instant invention are applicable to the processing of other pigments or extenders, such as lithopone, zinc sulphide, calcium sulphate, barium sulphate, etc., which, like titanium dioxide, are prepared by processes involving precipitation, calcination, and ball-milling to acquire those qualities desired or required when they are used for pigmenting and/or extending paints, lacquers, resins, and congeneric compositions. Accordingly, it is intended that the various pigments or extenders that are put through treatments similar to those employed in the preparation of titanium dioxide shall be considered as the equivalents of titanium dioxide and that the appended claims are to be construed as being imbued with such equivalency even though titanium dioxide may be the pigment set forth specifically therein.

I claim:

1. A method of producing from precipitated titanic hydroxide, part of whose solids content consists of particles of a size smaller than the wave length of visible light, an improved titanium dioxide pigment capable of smoothly covering surfaces with uniform texture and high opacity, which comprises calcining said precipitated titanic hydroxide and thereby transforming its content of particles smaller than the wave length of light just beyond the visible range into titanium dioxide aggregates of distinctly larger size, ball-milling the resulting calcined titanium dioxide pigment in the presence of water to form a pigment suspension, continuously centrifuging the resulting pigment suspension under substantially constant solids-depositing conditions, including substantially constant effective centrifuging force, to remove coarse pigment particles while leaving the fine pigment particles in suspension, and recovering the fine pigment particles from suspension as an improved titanium dioxide pigment of substantially constant particle size characteristics throughout the centrifuging operation.

2. A method of producing from precipitated titanic hydroxide, part of whose solids content consists of particles of a size smaller than the wave length of visible light, an improved titanium dioxide pigment capable of smoothly covering the surfaces with uniform texture and high opacity, which comprises calcining said precipitated titanic hydroxide and thereby transforming its content of particles smaller than the wave length of light just beyond the visible range into titanium dioxide aggregates of distinctly larger size, ball-milling the resulting calcined titanium dioxide pigment in the presence of water to form a pigment suspension, continuously centrifuging the resulting pigment suspension under substantially constant solids-depositing conditions, including substantially constant effective centrifuging force, to remove coarse pigment particles while leaving the fine pigment particles in suspension, adding to the suspension of fine pigment particles a flocculating agent in amount sufficient to flocculate such particles, and recovering the flocculated pigment particles from suspension as as improved titanium dioxide pigment of substantially constant particle size characteristics throughout the centrifuging operation.

3. A method of producing from precipitated titanic hydroxide, part of whose solids content consists of particles of a size smaller than the wave length of visible light, an improved titanium dioxide pigment capable of smoothly covering surfaces with uniform texture and high opacity, which comprises calcining said precipitated titanic hydroxide and thereby transforming its content of particles smaller than the wave length of light just beyond the visible range into titanium dioxide aggregates of distinctly larger size, ball-milling the resulting calcined titanium dioxide pigment in the presence of water to form a pigment suspension, continuously centrifuging the resulting pigment suspension under substantially constant solids-depositing conditions, including constant effective centrifuging force, to remove coarse pigment particles while leaving the fine pigment particles in suspension, and recovering the fine pigment particles from suspension under combined centrifugal and electrophoretic forces as an improved titanium dioxide pigment of substantially constant particle size characteristics throughout the centrifuging operation.

4. A method of producing from precipitated titanic hydroxide, part of whose solids content consists of particles of a size smaller than the wave length of visible light, an improved titanium dioxide pigment capable of smoothly covering surfaces with uniform texture and high opacity, which comprises calcining said precipitated titanic hydroxide and thereby transforming its content of particles smaller than the wave length of light just beyond the visible range into titanium dioxide aggregates of distinctly larger size, ball-milling the resulting calcined titanium dioxide pigment in the presence of water to form a pigment suspension substantially devoid of pigment-dispersing agent, continuously centrifuging the resulting pigment suspension under substantially constant solids-depositing conditions, including constant effective centrifuging force, to remove pigment particles coarser than about 2 microns while leaving the finer pigment particles in suspension, and recovering the finer pigment particles from suspension as an improved titanium dioxide pigment of substantially constant particle size characteristics throughout the centrifuging operation.

5. A method of producing from precipitated titanic hydroxide, part of whose solids content consists of particles of a size smaller than the wave length of visible light, an improved titanium dioxide pigment capable of smoothly covering surfaces with uniform texture and high opacity, which comprises calcining said precipitated titanic hydroxide and thereby transforming its content of particles smaller than the wave length of light just beyond the visible range into titanium dioxide aggregates of distinctly larger size, ball-milling the resulting calcined titanium dioxide pigment in the presence of water to form a pigment suspension substantially devoid of pigment-dispersing agent, continuously centrifuging the resulting pigment suspension under substantially constant solids-depositing conditions, including substantially constant effective centrifuging force, to remove pigment particles coarser than about 2 microns while leaving the finer pigment particles in suspension, adding to the suspension of finer pigment particles a flocculating agent in amount sufficient to flocculate such particles, and recovering the flocculated pigment particles from suspension as an improved titanium dioxide pigment of substantially constant particle size characteristics throughout the centrifuging operation.

6. A method of producing from precipitated titanic hydroxide, part of whose solids content consists of particles of a size smaller than the wave length of visible light, an improved titanium dioxide pigment capable of smoothly covering surfaces with uniform texture and high opacity, which comprises calcining said precipitated titanic hydroxide and thereby transforming its content of particles smaller than the wave length of light just beyond the visible range into titanium dioxide aggregates of distinctly larger size, ball-milling the resulting calcined titanium dioxide pigment in the presence of water to form a thick pigment suspension, continuously centrifuging the resulting pigment suspension under substantially constant solids-depositing conditions, including substantially constant effective centrifuging force, and at a solids content markedly greater than about 12% to remove coarse pigment particles while leaving the fine pigment particles in suspension, and recovering the fine pigment particles from suspension as an improved titanium dioxide pigment of substantially constant particle size characteristics throughout the centrifuging operation.

7. A method of producing from precipitated titanic hydroxide, part of whose solids content consists of particles of a size smaller than the wave length of visible light, an improved titanium dioxide pigment capable of smoothly covering surfaces with uniform texture and high opacity, which comprises calcining said precipitated titanic hydroxide and thereby transforming its content of particles smaller than the wave length of light just beyond the visible range into titanium dioxide aggregates of distinctly larger size, ball-milling the resulting calcined titanium dioxide pigment in the presence of water to form a thick pigment suspension, continuously centrifuging the resulting pigment suspension under substantially constant solids-depositing conditions, including substantially constant effective centrifuging force, and at a solids content markedly greater than about 12% to remove pigment particles coarser than about 2 microns while leaving the finer pigment particles in suspension, and recovering the finer pigment particles from suspension as an improved titanium dioxide pigment of substantially constant particle size characteristics throughout the centrifuging operation.

8. A method of producing from precipitated titanic hydroxide, part of whose solids content consists of particles of a size smaller than the wave length of visible light, an improved titanium dioxide pigment capable of smoothly covering surfaces with uniform texture and high opacity, which comprises calcining said precipitated titanic hydroxide and thereby transforming its content of particles smaller than the wave length of light just beyond the visible range into titanium dioxide aggregates of distinctly larger size, ball-milling the resulting calcined titanium dioxide pigment in the presence of water to form a thick pigment suspension, continuously centrifuging the resulting pigment suspension under substantially constant solids-depositing conditions, including substantially constant effective centrifuging force, and at a solids content markedly greater than about 12% to remove pigment particles coarser than about 2 microns while leaving the finer pigment particles in suspension, adding to the suspension of finer pigment particles a flocculating agent in amount sufficient to flocculate such particles, and recovering the flocculated pigment particles from suspension as an improved titanium dioxide pigment of substantially constant particle size characteristics throughout the centrifuging operation.

9. A method of producing from precipitated titanic hydroxide, part of whose solids content consists of particles of a size smaller than the wave length of visible light, an improved titanium dioxide pigment capable of smoothly covering surfaces with uniform texture and high opacity, which comprises calcining said precipitated titanic hydroxide and thereby transforming its content of particles smaller than the wave length of light just beyond the visible range into titanium dioxide aggregates of distinctly larger size, ball-milling the resulting calcined titanium dioxide pigment in the presence of water to form a thick pigment suspension, continuously centrifuging the resulting pigment suspension under substantially constant solids-depositing conditions, including substantially constant effective centrifuging force, and at a solids content markedly greater than about 12% to remove pigment particles coarser than about 2 microns while leaving the finer pigment particles in suspension, and recovering the finer pigment particles from suspension under combined centrifugal and electrophoretic forces as an improved titanium dioxide pigment of substantially constant particle size characteristics throughout the centrifuging operation.

10. A method of producing from precipitated titanic hydroxide, part of whose solids content consists of particles of a size smaller than the wave length of visible light, an improved titanium dioxide pigment capable of smoothly covering surfaces with uniform texture and high opacity, which comprises calcining said precipitated titanic hydroxide and thereby transforming its content of particles smaller than the wave length of light just beyond the visible range into titanium dioxide aggregates of distinctly larger size, ball-milling the resulting calcined titanium dioxide pigment in the presence of water to form a thick pigment suspension substantially devoid of pigment-dispersing agent, continuously centrifuging the resulting pigment suspension under substantially constant solids-depositing conditions, including substantially constant effective centrifuging force, and at a solids content markedly greater than about 12% to remove pigment particles coarser than about 2 microns while leaving the finer pigment particles in suspension, flocculating the finer pigment particles left in suspension, dewatering the flocculated pigment particles to substantial dryness, and disintegrating the dried pigment mass to provide an improved titanium dioxide pigment of substantially constant size characteristics throughout the centrifuging operation.

11. A method of producing from precipitated titanic hydroxide, part of whose solids content consists of particles of a size smaller than the wave length of visible light, an improved titanium dioxide pigment capable of smoothly covering surfaces with uniform texture and high opacity, which comprises calcining said precipitated titanic hydroxide and thereby transforming its content of particles smaller than the wave length of light just beyond the visible range into titanium dioxide aggregates of distinctly larger size, ball-milling the resulting calcined titanium dioxide pigment in the presence of water to form a thick pigment suspension substantially devoid of pigment-dispersing agent, continuously centrifuging the resulting pigment suspension under substantially constant solids-depositing conditions, including substantially constant effective centrifuging force, and at a solids content markedly greater than about 12% to remove pigment particles coarser than about 2 microns while leaving the finer pigment particles in suspension, flocculating the finer pigment particles left in suspension, filtering the flocculated pigment particles, drying the filtered pigment mass, and disintegrating the dried mass to provide an improved titanium dioxide pigment of substantially constant particle size characteristics throughout the centrifuging operation.

12. A method which comprises continuously feeding calcined titanium oxide pigment and water through a ball mill while ball-milling such pigment to produce an aqueous slurry containing a pigment fraction of oversized particles and a pigment fraction of the desired fine particles, continuously centrifuging the aqueous slurry of ball-milled pigment under substantially constant solids-depositing conditions, including substantially constant effective centrifuging force, to remove continuously therefrom the pigment fraction of oversized particles and to produce continuously a suspension of an improved titanium dioxide pigment of substantially constant particle size characteristics throughout the centrifuging operation and continuously feeding substantially only such removed pigment fraction together with newly calcined titanium oxide pigment and water being fed through the ball mill.

13. A method which comprises continuously feeding calcined titanium oxide pigment and water through a ball mill while ball-milling such pigment to produce an aqueous slurry containing a pigment fraction of oversized particles and a pigment fraction of the desired fine particles, continuously centrifuging the aqueous slurry of ball-milled pigment under substantially constant solids-depositing conditions, including substantially constant effective centrifuging force, and at a solids content of about 30% to 45% to remove continuously therefrom the pigment fraction of oversized particles and to produce continuously a suspension of an improved titanium dioxide pigment of substantially constant particle size characteristics throughout the centrifuging operation and continuously feeding substantially only such removed pigment fraction together with newly calcined titanium oxide pigment and water being fed through the ball mill.

14. A method which comprises continuously feeding calcined titanium oxide pigment and water through a ball mill while ball-milling such pigment to produce an aqueous slurry containing upwards of about 30% solids as both a pigment fraction of oversized particles and a pigment fraction of the desired fine particles, continuously centrifuging the aqueous slurry of ball-milled pigment under substantially constant solids-depositing conditions, including substantially constant effective centrifuging force, and at a solids content upwards of about 30% to remove continuously therefrom the pigment fraction of oversized particles and to produce continuously a suspension of an improved titanium dioxide pigment of substantially constant particle size characteristics throughout the centrifuging operation and continuously feeding substantially only such removed pigment fraction together with newly calcined titanium oxide pigment and water being fed through the ball mill.

15. A method which comprises continuously feeding calcined titanium oxide pigment and water through a ball mill while ball-milling such pigment to produce an aqueous slurry containing upwards of about 30% solids as both a pigment fraction of oversized particles and a pigment fraction of the desired fine particles, continuously centrifuging the aqueous slurry of ball-milled pigment under substantially constant solids-depositing conditions, including substantially constant effective centrifuging force, and at a solids content of about 30% to 45% to remove continuously therefrom the pigment fraction of oversized particles and to produce continuously a suspension of an improved titanium dioxide pigment of substantially constant particle size characteristics throughout the centrifuging operation, and continuously feeding substantially only such removed fraction together with newly calcined titanium oxide pigment and water being passed through the ball mill.

SANFORD C. LYONS.